United States Patent
Bazzo et al.

(10) Patent No.: US 10,518,450 B2
(45) Date of Patent: Dec. 31, 2019

(54) INJECTOR FOR APPARATUS FOR INJECTION MOULDING OF PLASTIC MATERIALS FOR THE PRODUCTION OF TRANSPARENT OR SEMI-TRANSPARENT AESTHETIC COMPONENTS FOR MOTOR VEHICLES, FOR EXAMPLE LAMP LENSES, AND AN INJECTION MOULDING APPARATUS

(71) Applicant: INGLASS S.p.A., San Polo di Piave (Treviso) (IT)

(72) Inventors: Maurizio Bazzo, San Polo di Piave (IT); Massimo Rossi, San Polo di Piave (IT); Fabio Bordignon, San Polo di Piave (IT); Emanuel Bernardi, San Polo di Piave (IT)

(73) Assignee: INGLASS S.p.A., San Polo di Piave (Treviso) (IT)

( * ) Notice: Subject to any disclaimer, the term of this patent is extended or adjusted under 35 U.S.C. 154(b) by 103 days.

(21) Appl. No.: 15/287,790

(22) Filed: Oct. 7, 2016

(65) Prior Publication Data

US 2017/0100866 A1    Apr. 13, 2017

(30) Foreign Application Priority Data

Oct. 12, 2015 (IT) .......................... 102015000060495

(51) Int. Cl.
*B29C 45/23* (2006.01)
*B29C 45/27* (2006.01)
*B29L 31/30* (2006.01)

(52) U.S. Cl.
CPC .............. *B29C 45/23* (2013.01); *B29C 45/27* (2013.01); *B29K 2995/0026* (2013.01); *B29L 2031/30* (2013.01)

(58) Field of Classification Search
CPC . B29C 45/27; B29C 45/2806; B29C 45/2711; B29C 2045/2761;

(Continued)

(56) References Cited

U.S. PATENT DOCUMENTS 4,043,740 A * 8/1977 Gellert ................... B29C 45/278
                                                    425/548
4,286,941 A * 9/1981 Gellert ................ B29C 45/2806
                                                    425/566

(Continued)

FOREIGN PATENT DOCUMENTS

CN          101301779 A       11/2008
CN          103112129 A        5/2013

(Continued)

OTHER PUBLICATIONS

Search Report dated Jun. 8, 2016, for Italian Application No. 102015000060495, 7 pages.

(Continued)

*Primary Examiner* — Xiao S Zhao
*Assistant Examiner* — Emmanuel S Luk
(74) *Attorney, Agent, or Firm* — RMCK Law Group PLC

(57) ABSTRACT

A nozzle terminal of an injector comprises a tip and a ring nut having respective distal ends one of which is configured so as to be coupled with a gate of a moulding cavity, it cooperates with the shutter terminal of the valve pin of the injector, and it has an overall thickness in cross-section which is equal to or less than that of the cross-section of the shutter terminal of the valve pin.

3 Claims, 4 Drawing Sheets

(58) Field of Classification Search
CPC ...... B29C 2045/272; B29C 2045/2764; B29C 2045/2045; B29C 2045/2759; B29C 45/278; B29C 45/2708; B29C 45/23; B29C 2045/2787
See application file for complete search history.

(56) References Cited

U.S. PATENT DOCUMENTS

| | | | | |
|---|---|---|---|---|
| 4,810,184 | A * | 3/1989 | Gellert | B23P 15/007 |
| | | | | 425/548 |
| 4,892,474 | A | 1/1990 | Gellert | |
| 4,931,009 | A * | 6/1990 | Gellert | B29C 45/27 |
| | | | | 264/328.15 |
| 5,269,677 | A * | 12/1993 | Gauler | B29C 45/27 |
| | | | | 264/297.2 |
| 5,849,343 | A * | 12/1998 | Gellert | B29C 45/2711 |
| | | | | 425/549 |
| 6,183,239 | B1 * | 2/2001 | Belous | B29C 45/27 |
| | | | | 425/564 |
| 6,220,850 | B1 * | 4/2001 | Catoen | B29C 45/2711 |
| | | | | 264/328.16 |
| 6,234,783 | B1 * | 5/2001 | Shibata | B29C 45/27 |
| | | | | 425/549 |
| 6,394,785 | B1 * | 5/2002 | Ciccone | B29C 45/27 |
| | | | | 264/328.15 |
| 7,160,100 | B2 * | 1/2007 | Hagelstein | B29C 45/27 |
| | | | | 425/549 |
| 2003/0211199 | A1 * | 11/2003 | Eigler | B29C 45/27 |
| | | | | 425/571 |
| 2003/0235638 | A1 * | 12/2003 | Gellert | B29C 45/27 |
| | | | | 425/568 |
| 2004/0208949 | A1 * | 10/2004 | Niewels | B29C 45/2711 |
| | | | | 425/549 |
| 2005/0046057 | A1 * | 3/2005 | Asano | B29C 45/20 |
| | | | | 264/1.33 |
| 2005/0226956 | A1 | 10/2005 | Fischer et al. | |
| 2008/0268088 | A1 * | 10/2008 | Kmoch | B29C 45/2711 |
| | | | | 425/547 |
| 2008/0268089 | A1 * | 10/2008 | Kmoch | B29C 45/2711 |
| | | | | 425/548 |
| 2009/0194903 | A1 * | 8/2009 | Bouti | B29C 45/278 |
| | | | | 264/211.24 |
| 2010/0044896 | A1 | 2/2010 | Tabassi et al. | |
| 2010/0092601 | A1 * | 4/2010 | Klobucar | B29C 45/278 |
| | | | | 425/548 |
| 2013/0022705 | A1 * | 1/2013 | Hammond | B29C 45/278 |
| | | | | 425/567 |
| 2015/0110918 | A1 * | 4/2015 | Dezon-Gaillard | B29C 45/27 |
| | | | | 425/564 |

FOREIGN PATENT DOCUMENTS

JP        S5732923 A      2/1982
WO    2006123237 A2    11/2006

OTHER PUBLICATIONS

Chinese Office Acion and Search Report with English Translation dated Feb. 22, 2019. 49 pages.
Japanese Office Action and Summary with English Translation dated Jan. 22, 2019. 12 pages.
Korean Office Action dated Sep. 28, 2018 (6 pages).

* cited by examiner

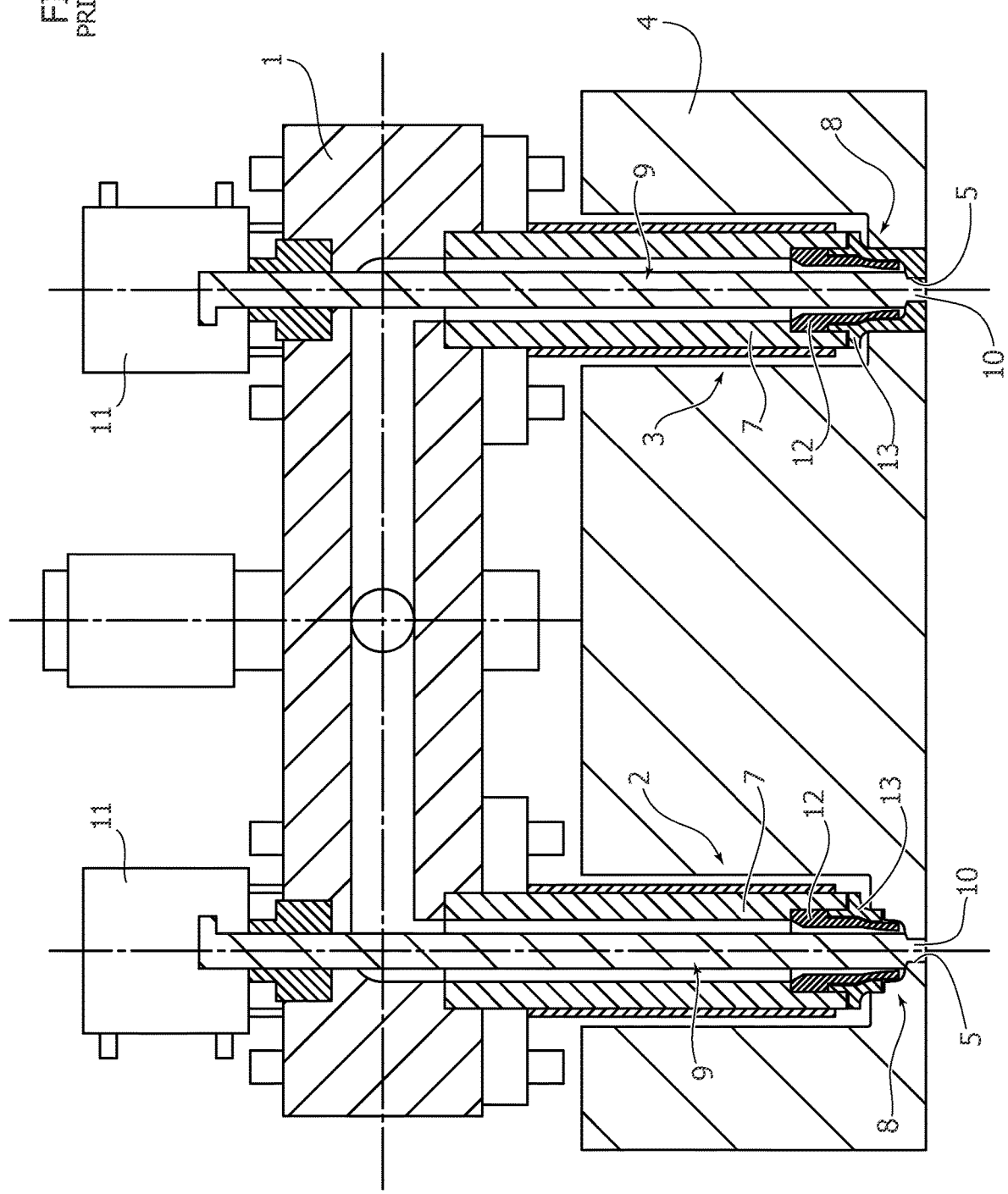

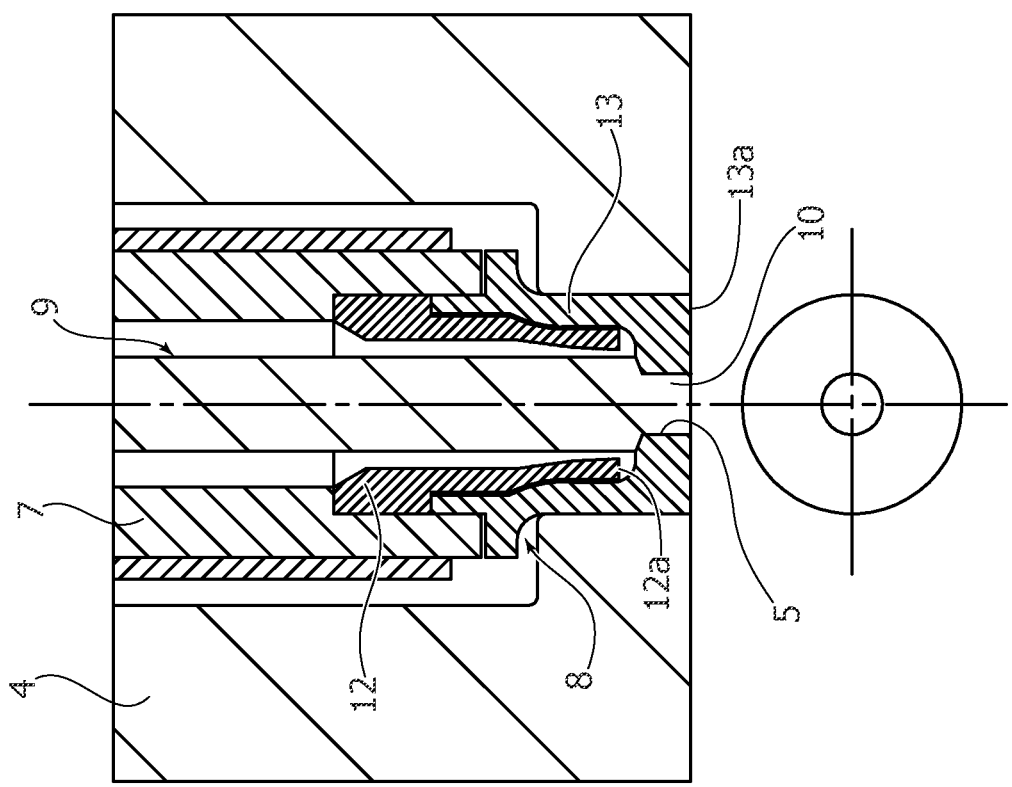
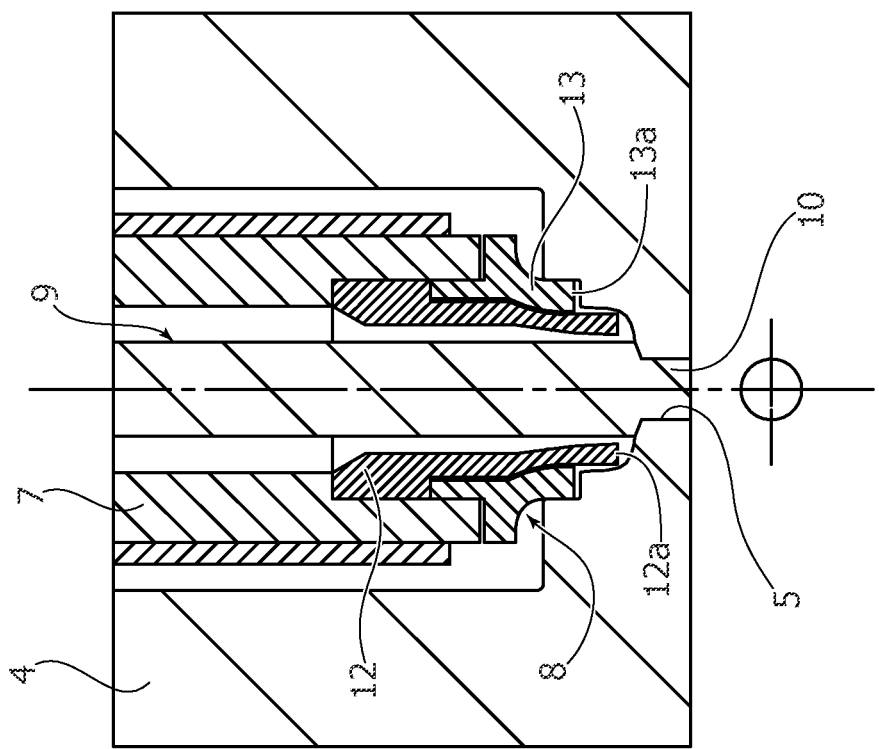

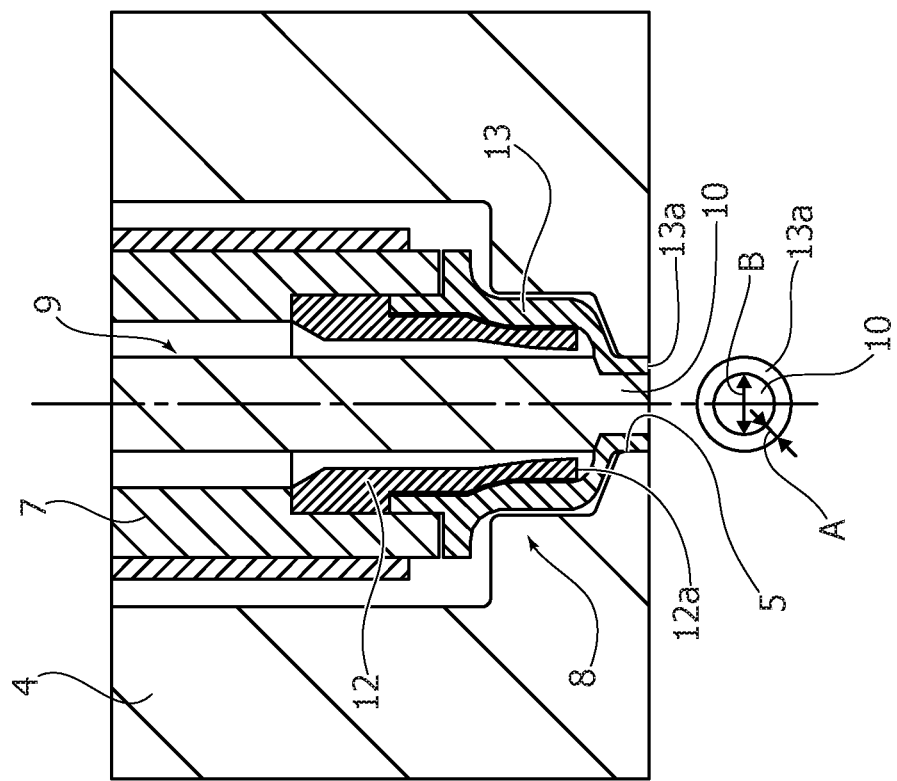
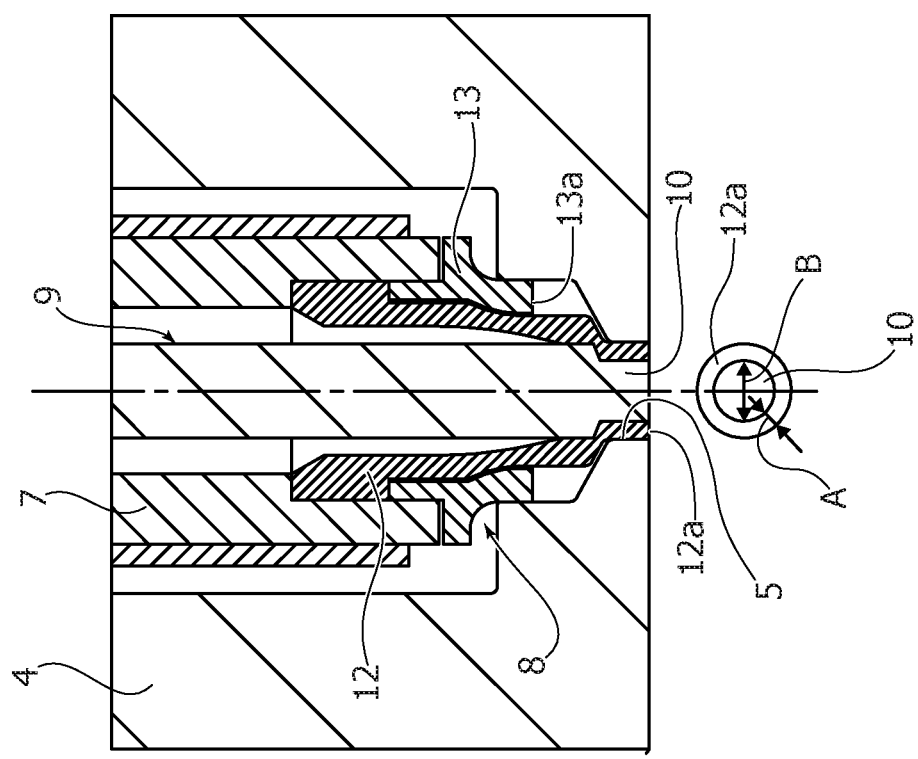

US 10,518,450 B2

INJECTOR FOR APPARATUS FOR INJECTION MOULDING OF PLASTIC MATERIALS FOR THE PRODUCTION OF TRANSPARENT OR SEMI-TRANSPARENT AESTHETIC COMPONENTS FOR MOTOR VEHICLES, FOR EXAMPLE LAMP LENSES, AND AN INJECTION MOULDING APPARATUS

CROSS REFERENCE TO RELATED APPLICATIONS

This application claims priority to Italian Patent Application No. 102015000060495 filed on Oct. 12, 2015, the entire disclosure of which is incorporated herein by reference.

FIELD OF THE INVENTION

The present invention regards apparatus for injection moulding of plastic materials and in particular injectors for moulding apparatus thus made, with reference to the production of transparent or semi-transparent aesthetic components for motor vehicles, for example lamp lenses.

STATE OF THE ART

A conventional injection moulding apparatus is schematically represented—in partial section—in FIG. 1 of the attached drawings: it comprises a hot chamber or distributor 1 for the fluid plastic material and one or more injectors 2, 3 for the introduction of pressurised plastic material into the cavity of a mould, whose matrix is indicated with 4, through respective gates 5, 6.

Each injector 2, 3 comprises a tubular nozzle 7 provided with a nozzle end, generally indicated with 8, which defines a fluid path for the injected plastic material. A valve pin 9 provided with a shutter terminal 10 is axially displaceable, by means of an electrical or fluid actuator 11, between a receded opening position and an advanced closing position of the nozzle terminal 8.

The nozzle terminal 8 may have different configurations, represented in detail by way of example in FIG. 2 relative to the injector 2 of FIG. 1, and in FIG. 3 relative to the injector 3 of FIG. 1. In both cases, the nozzle terminal 8 comprises an inner tubular element or tip 12 and an outer annular element or ring nut 13.

In the case of the nozzle terminal 8 of FIG. 2, the tip 12 extends axially with the distal end 12a thereof beyond the distal end 13a of the ring nut 13, projecting in the gate 5. Thus, the gate mark (represented in plan view under FIG. 2) which remains on the surface of the moulded article reveals very small dimensions, exclusively similar to the diameter of the shutter terminal 10 of the valve pin 9, this being particularly advantageous when it comes to moulding aesthetic components, in particular transparent or semi-transparent, and even more so in the case of motor vehicle lamps which require very high quality standards.

This solution, so-called with "outer" ring nut i.e. one not directly projecting in the moulding cavity, requires an accurate operation of the mould matrix 4, at the height of the distal ends of the tip 12 and ring nut 13, due to the constant variation of the radial overall dimension thereof as well as in particular the area of the gate 5 which receives the shutter terminal 10 of the valve pin 9 in the advanced closing position thereof. This implies the extension of the moulding apparatus production, procurement and operation times. In addition, processing challenges often lead to concentricity errors between the shutter terminal 10 of the valve pin 9 and the gate 5 of the matrix 4, with the ensuing faster wear of the two components if not breaking the very matrix, with serious economic damage to the mould.

Another problem related to this configuration lies in the presence of stagnation areas between the tip 12 and the ring nut 13, in which the plastic material deposits and from which it should be subsequently removed with quite some challenge, hence considerably increasing the number of moulding operations required to obtain an optimal process for changing the colour of the plastic material.

In an attempt to overcome such drawbacks, there was proposed the solution represented in FIG. 3, in which the nozzle terminal 8 is of the so-called "through" ring nut 13, i.e. whose distal end 13a axially extends beyond the distal end 12a of the tip 12 and it is directly projected in the moulding cavity. In this case, the gate 5 with which the shutter terminal 10 of the valve pin 9 cooperates is formed in the area of the distal end 13a of the ring nut 13, hence enabling considerable simplification in the operation of the matrix 4, hence reducing times and risk of error. However, as represented in plan view in the lower part of FIG. 3, to the gate mark corresponding to the shutter terminal 10 there is also added that of the distal end 13a of the ring nut 13, with dimensions that are much greater and actually unacceptable when it comes to moulding transparent aesthetic components and in particular motor vehicle lamp lenses. In addition, problems related to areas of stagnation of the plastic material remain in this solution too.

SUMMARY OF THE INVENTION

The object of the present invention is to overcome the aforementioned prior art drawbacks, and this object is attained by means of an injector for an injection moulding apparatus of the type outlined above, and wherein the tip and the ring nut of the nozzle terminal have respective distal ends, whose distinctive characteristics lie in the fact that one of such distal ends is configured so as to be coupled with a gate of a moulding cavity; it cooperates with the shutter terminal of the valve pin; and it has an overall thickness in cross-section which is equal or lesser than that of the cross-section of the shutter terminal of the valve pin.

The characteristic according to which the distal end of the tip, i.e. the distal end of the ring nut, is extended (so to say), i.e. it is such to be able to extend in the gate of the mould to project in the moulding cavity, offers the advantage of considerably simplifying the operation of the mould matrix.

On the other hand, the low wall thickness of the distal end of the tip i.e. of the distal end of the ring nut allows equally considerably reducing the dimensions of the gate mark visible on the moulded article, which will be slightly larger than the imprint of the shutter terminal of the valve pin and basically similar thereto.

The invention provides for two alternative embodiments in the first of which the distal end is that of the tip and in the other of which the distal end is that of the ring nut.

The first embodiment is currently considered the preferred one in that it attains the further advantage of eliminating the areas of stagnation of the plastic material in the nozzle terminal 8. In addition, it provides a greater guide surface for the shutter terminal 10 of the valve pin 9, thus overcoming problems related to concentricity.

Conveniently, the wall thickness of such distal end will be ≤1.5 mm, and preferably ≤0.5 mm.

The tip may have a structure made up of a radially inner element made of a first material and a radially outer element made of a second material, with the aim of optimising the thermal profile and the mechanical/chemical resistance characteristics, for example according to the description and illustrations subject of the Italian patent application n° 102015000044745 on behalf of the same Applicant, not published as of date of filing of the present application.

The invention is particularly advantageous in application to injection moulding apparatus provided with multiple injectors controlled according to sequential or cascade cycles for the production of transparent or semi-transparent aesthetic components for motor vehicles, for example lamp lenses.

BRIEF DESCRIPTION OF THE DRAWINGS

In the attached drawings:

FIG. 1 is a partially sectional schematic view of an apparatus for injection moulding of plastic materials according to the previously described prior art, FIGS. 2 and 3 represent, in larger scale, two details of the prior art moulding apparatus according to FIG. 1, FIGS. 5 and 6 are two enlargements showing, in greater detail, the two alternative configurations of the injectors according to the invention.

DETAILED DESCRIPTION OF THE INVENTION

Figure 4:
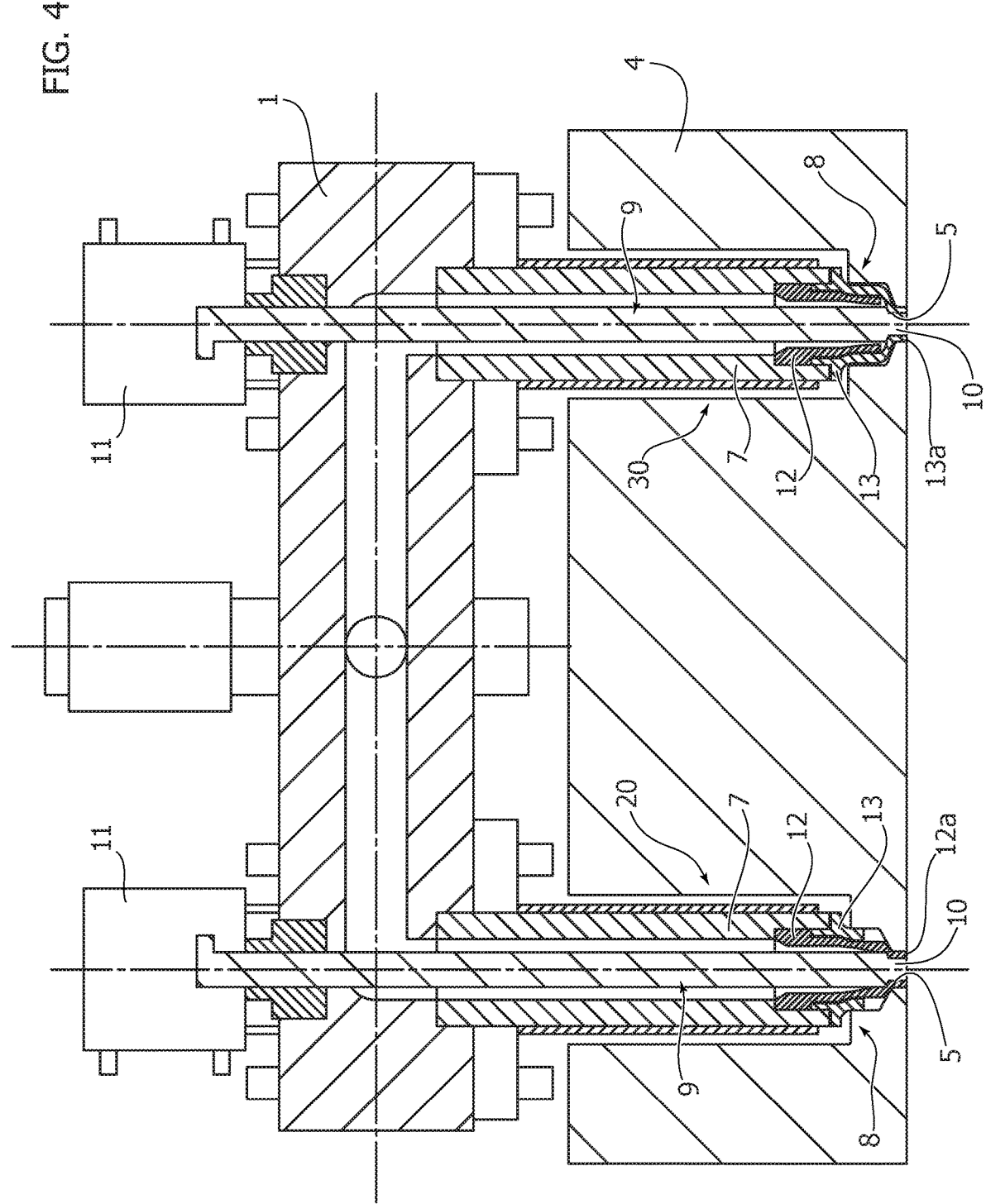
FIG. 4 is a view analogous to FIG. 1 showing an injection moulding apparatus according to the invention with two different alternative configurations of the injectors.

The parts represented in FIGS. 4, 5 and 6 that are identical or similar to those described previously with reference to FIGS. 1, 2 and 3 are indicated with the same reference numbers and will not be described further in detail.

The innovative and unique distinctive characteristic of the invention with respect to the prior art lies in the nozzle terminal 8 of the two injectors, respectively indicated with 20 and 30 in FIG. 4 according to the two alternative configurations provided for.

In the case of the injector 20, and as represented further in detail in FIG. 5, the distal end 12*a* of the tip 12 is extended (so to say), in the sense that it is shaped to form a cylindrical bushing directly inserted into the gate 5 of the matrix 4, until it projects in the moulding cavity. The shutter terminal 10 of the valve pin 9 is also cylindrical-shaped conveniently with a small cross-section, i.e. smaller than that of the valve pin 9, and it directly cooperates with such distal end 12*a*, as illustrated in FIG. 5 which represents the advanced closing position of the valve pin 9.

According to a further distinctive characteristic of the invention, the overall wall thickness of the end 12*a* of the tip 12, i.e. the annular cross-section thereof, is not greater and thus equal or preferably lesser than the thickness i.e. diameter of the cross-section of the shutter terminal 10, of the valve pin 9. Thus, in the operation of the injector and the injection apparatus it is provided with, the gate mark which will be visible on the moulded article will have the shape shown in plan view under FIG. 5: it is clear that it will be almost imperceptibly larger than the one caused by the shutter terminal 10 of the valve pin 9.

Preferably, the wall thickness of the distal end 12*a* of the tip 12—i.e. the difference between the outer radius and the inner radius of the annular section thereof, indicated with A in the projection under FIG. 5 in which B indicates the diameter of the shutter terminal 10 of the valve pin 9—is ≤1.5 mm. and even more preferably ≤0.5 mm.

In addition, the extended shape of the tip 12 in the area of the distal end 12*a* thereof guarantees a greater guide surface for the valve pin 9, in particular in the area prior to the gate 5.

Lastly, the presence of a single extended inner body formed by the tip 12, which extends into the gate 5, overcomes the problem related to the presence of material stagnation areas.

In the case of the second embodiment represented in detail in FIG. 6 it is the distal end 13*a* of the ring nut 13 that extends into the gate 5 until it projects in the moulding cavity, and cooperates with the shutter terminal 10 of the valve pin 9. Even in this case, the overall wall thickness of the cylindrical appendage which forms the distal end 13*a* of the ring nut 13 is equal or lesser than the diameter of the shutter terminal 10 with smaller cross-section of the valve pin 9. The ensuing gate mark, represented under FIG. 6, will be—in this case—similar to the one represented under FIG. 5 regarding the first embodiment described above.

In summary, as mentioned, indicating the wall thickness of the distal end 12*a* or the distal end 13*a*—i.e. the difference between outer radius and inner radius of the annular section thereof—with A, and the diameter of the cross-section of the shutter terminal 10 of the valve pin 9 with B, the following relation shall be observed:

$$2A \leq B$$

i.e. the overall thickness 2A of the distal end 12*a* or the distal end 13*a* is equal or lesser than that of the cross-section B of the shutter terminal 10 of the valve pin 9, and preferably A≤1.5 mm and more conveniently A≤0.5 mm.

It should be emphasised that the injector and apparatus according to the invention are particularly advantageous for production by means of injection moulding of transparent or semi-transparent aesthetic components for motor vehicles, for example lamp lenses, having one or more gate marks whose thickness will be equivalent to 2A, i.e. equivalent to the cross-section of the distal end 12*a*, 13*a* of the tip 12 or the ring nut 13 and thus lesser or at most equal to the thickness B similar to the cross-section of the shutter terminal 10.

Obviously, without prejudice to the principle of the invention, the construction details and the embodiments—in particular as regards the general configuration of the nozzle terminal 8—may widely vary with respect to what has been described and illustrated, without departing from the scope of protection of the present invention as described in the claims that follow.

For example, in the case of the nozzle terminal 8 with a frusto-conical shaped distal end (complementary to the shutter terminal 10 of the valve pin 9), the reference cross-section for the invention will be the extreme smaller one, directly projecting in the moulding cavity.

The invention claimed is:

1. An injector for apparatus for injection moulding of plastic materials for production of transparent or semi-transparent aesthetic components for motor vehicles, including a nozzle having a nozzle terminal defining a flow path for injected plastic material and a valve pin having an extended cylindrical shutter terminal and axially displaceable between a receded opening position and an advanced closing position of the nozzle terminal, wherein said extended cylindrical shutter terminal includes a necked down portion having a cylindrical outer diameter smaller than a preceding portion of the valve pin, wherein said nozzle terminal comprises:

an inner tubular element or tip having a proximal end and a distal end and being affixed to an inside of the nozzle, and an annular ring nut that includes a distal end and is affixed externally and coaxially to the tip between and spaced apart from the proximal and distal ends of the tip, and wherein said distal end of the tip:

is configured so as to be coupled with a gate of a moulding cavity, includes an inner diameter that cooperates with said outer diameter of the necked down portion of the extended shutter terminal of the valve pin, has an overall thickness in cross-section which is equal to or less than that of the cross section of the shutter terminal of the valve pin, and is sized and shaped to form a cylindrical bushing directly inserted within the gate, the cylindrical bushing configured to directly engage the extended cylindrical shutter terminal and extend beyond the gate to provide a guide for the extended cylindrical shutter terminal of the valve pin prior to the gate.

2. The injector according to claim 1, wherein said distal end of the tip has a wall thickness ≤1.5 mm.

3. The injector according to claim 1, wherein said distal end of the tip has a wall thickness ≤0.5 mm.

* * * * *